United States Patent Office 2,888,419
Patented May 26, 1959

2,888,419

POLYETHYLENE COMPOSITION CONTAINING ORGANOPOLYSILOXANE RESIN

Moyer M. Safford, Schenectady, N.Y., assignor to General Electric Company, a corporation of New York No Drawing. Application December 5, 1955
Serial No. 550,834

5 Claims. (Cl. 260—29.1)

This invention relates to polyethylene of improved properties. More particularly, this invention relates to compositions of enhanced extrudibility comprising (1) polyethylene, (2) filler, and (3) minor amounts of an organopolysiloxane; and to a process of extruding filled polyethylene which comprises incorporating minor amounts of an organopolysiloxane in filled polyethylene and extruding the resulting composition. This invention also relates to compositions comprising (1) polyethylene, (2) filler, (3) minor amounts of an organopolysiloxane, and (4) di-α-cumyl peroxide; and the cured products thereof, said compositions possessing improved aging characteristics.

Among the polymeric materials which have evolved in recent years, polyethylene has proved to be one of the most popular. It has found wide usage as an insulating material, as a container material, as a conduit material, etc. Fabrication, molding, extrusion and calendering of polyethylene are readily accomplished by standard methods, thus facilitating its use for many purposes.

By using extrusion techniques polyethylene can be applied to a large number of uses such as, for example, the insulation of wire and cable, the preparation of thin films, the coating of paper, the fabrication of such shapes as tubes, pipes, rods, etc. In these applications the ease of extruding polyethylene is of extreme importance, for in commercial operations polyethylene should be able to be extruded at high speeds. However, in order to be extruded at high speeds the polymer should flow easily, form a smooth surface, and have a minimum of toughness or nerve. These properties are particularly difficult to obtain with filled polyethylene since filled polyethylene extrudes comparatively slowly and the extruded product has a rough surface.

I have now discovered that by incorporating a minor amount of an organopolysiloxane in filled polyethylene one obtains a more extrudible composition since this composition flows more easily, forms a smoother surface, and has less nerve than filled polyethylene itself. In addition, whether extruded or fabricated by other means, the compositions of this invention possess improved aging characteristics.

In general, this invention is carried out by intimately mixing polyethylene, filler, and minor amounts of an organopolysiloxane with a peroxide added if a cured product is desired. The admixture of ingredients can be effected by any convenient method, for example, on a 2-roll rubber mill, a Banbury mixer, etc. Thereupon, the compositions of this invention can be extruded by any of the methods known to the extrusion art. A good general discussion of methods and apparatus for extruding polyethylene is found in "Modern Plastics," Encyclopedia Issue, September 1955, pages 540–546. These methods and apparatus can be used in extruding the compositions of this invention.

The polyethylene referred to herein is a polymeric material formed by the polymerization of ethylene at either low or high pressures. It is described in Patent 2,153,533, Fawcett et al., and in "Modern Plastics Encyclopedia," New York, 1949, pages 268–271. Specific examples of commercially available polyethylene are the polyethylenes sold by E. I. Du Pont de Nemours & Co., Inc., Wilmington, Delaware, examples of which are "Alathons 1, 3, 10, 12, 14, etc.," those sold by the Bakelite Company, such as "DE-2400, 3422, DYNH, etc.," and the low pressure Phillips Petroleum Company polymers, such as "Marlex 20, 50, etc." An excellent discussion of the low pressure polyethylene within the scope of this invention is found in "Modern Plastics," vol. 33, #1, (September 1955), commencing on page 85.

The organopolysiloxanes employed in this invention are organopolysiloxanes curable to the solid elastic state. The curable organopolysiloxane or silicone compositions may be highly viscous masses, or gummy elastic solids, depending on the state of condensation, the condensing agent employed, the starting organopolysiloxane used to make the curable organopolysiloxanes, etc. Although curable organopolysiloxanes with which the present invention is concerned are well known, for purposes of showing persons skilled in the art the various organopolysiloxanes which may be employed in the practice of the present invention, attention is directed to the curable organopolysiloxanes disclosed and claimed in Agens Patent 2,448,756; Sprung et al. Patent 2,448,556; Sprung Patent 2,484,595; Krieble et al. Patent 2,457,688; Hyde Patent 2,490,357; Marsden Patent 2,521,528; and Warrick Patent 2,541,137.

It will, of course, be understood by those skilled in the art that other curable organopolysiloxanes containing the same or different silicon-bonded organic substituents (alkyl, e.g. methyl, ethyl, propyl, butyl, octyl, etc.; alkenyl, e.g. vinyl, allyl, etc., cycloalkenyl, e.g. cyclohexenyl, etc. aryl e.g. phenyl, tolyl, xylyl, naphthyl, etc.; aralkyl, e.g. benzyl, phenylethyl, etc.; halogenated aryl, e.g. chlorophenyl, dibromophenyl, fluorophenyl, etc.; cycloalkyl e.g. cyclohexyl, etc.; alkinyl e.g. ethinyl, etc.; both methyl and phenyl, etc., radicals) connected to silicon atoms by carbon-silicon linkages, may be employed without departing from the scope of the invention. The above substituents may be generically described as monovalent hydrocarbon radicals and monovalent, halogenated-aryl hydrocarbon radicals.

The particular curable organopolysiloxane used may be any one of those described in the foregoing patents and is generally obtained by condensing a liquid organopolysiloxane containing an average of from about 1.9 to 2.1 preferably from about 1.98 to about 2.01, silicon-bonded organic groups per silicon atom. The usual condensing agents which may be employed and which are well known in the art may include, for instance, acid condensing agents e.g. ferric chloride hexahydrate, phenyl phosphoryl chloride, and the like; alkaline condensing agents e.g. quaternary phosphonium hydroxides and alkoxides, solid quaternary ammonium hydroxides, potassium hydroxide, cesium hydroxide, etc. These curable organopolysiloxanes generally comprise polymeric diorganosiloxanes which may contain, for example, from 0 to 2 mol percent copolymerized monoorganosiloxane, for example, co-polymerized monomethylsiloxane. Generally, I prefer to use as the starting organopolysiloxane from which the curable organopolysiloxanes are prepared, one which contains about 1.98 to 2.01, inclusive, organic groups, for example, methyl groups per silicon atom where more than about 90% of the silicon atoms in the polysiloxane contain 2 silicon-bonded dialkyl groups.

The starting organopolysiloxanes used to make the curable organopolysiloxanes by condensation thereof preferably comprise organic substituents consisting essentially of monovalent organic radicals attached to silicon through carbon-silicon linkages and in which the siloxane units consist of units of the structural formula $R_2SiO$ where R is preferably a radical of the group consisting of methyl and phenyl radicals. At least 50% of the total number of R groups are preferably methyl radicals. The polysiloxane may be one in which all of the siloxane units are $(CH_3)_2SiO$ or the siloxane may be a copolymer of dimethylsiloxane and a minor amount (e.g., from 1 to 20 mol percent) of any of the following units alone or in combination therewith: $C_6H_5(CH_3)SiO$ and $(C_6H_5)_2SiO$.

For extrudibility, I can employ from 1–10 percent by weight of an organopolysiloxane based on total weight of the filled composition, preferably 1–5%. For heat aging characteristics from 0.1–20 percent, preferably 1–5%. Since it is highly desirable to keep polyethylene characteristics prevalent, I prefer to keep the organopolysiloxane content to a minimum consistent with achieving the desired improved properties. Thus, 1 to 2% of an organopolysiloxane can be advantageously added to filled polyethylene to impart both improved extrusion and aging characteristics.

Since filled polyethylene is more easily milled at temperatures of about 100–135° C. or above, it is necessary to use a peroxide which is stable at these temperatures. The most satisfactory peroxide is di-α-cumyl peroxide which can be milled at temperatures up to about 135° C. and cured at about 150° C. or above to produce cured polyethylene having excellent physical properties. This peroxide, which has the following formula

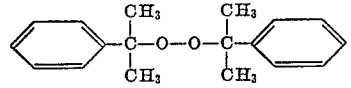

can be prepared by the method described by Kharasch et al. in the "Journal of Organic Chemistry," 15, 756–762 (1950). In addition, other peroxides which exhibit the high thermal decomposition characteristics of di-α-cumyl peroxide may also be used, for example substituted cumyl peroxides, etc. Furthermore, since these peroxides do not decompose at low temperatures, compositions containing them can be transported in commerce without deleterious effects.

The optimum amount of peroxide to be incorporated into the composition depends upon the time and temperature of the heat treatment, and the degree of cure desired in the polymer. Generally, if the peroxide composition is cured between 150 to 200° C., from 0.1–20% of the peroxide based on weight of polyethylene may be used, but preferably 0.5–10%. As a rule 2–4% of the peroxide yields a cured polyethylene satisfactory for most general applications. However, if polyethylene of greatly reduced thermoplasticity is desired, greater amounts of peroxide may be used.

If surface cure alone is desired without affecting the interior, the compositions of this invention containing no peroxide may be extruded into a solution containing the peroxide, and thereupon heat-cured to produce a case hardened polymer. Thin films or filaments extruded and heated in this manner will be sufficiently cured throughout.

In addition these compositions can be cured by high energy radiation.

Although a wide variety of fillers can be employed, the preferred fillers are finely divided silicas, calcium silicates, aluminas, and carbon blacks. These fillers are preferred since di-α-cumyl peroxide-cured polyethylene containing these fillers and minor amounts of organopolysiloxanes possess superior tensile strengths at elevated temperatures. Among the finely divided silicas are silica xerogels, silica aerogels, fumed silicas, hydrophobic silicas, etc., metal silicates such as calcium silicates and the like. These silicas and silicates are described in Iler, "The Colloid Chemistry of Silica and Silicates," Cornell University Press, Ithaca, N.Y. (1955). Other finely divided fillers that can be used are alpha and gamma aluminas such as described in U.S. Patent 2,671,069, Savage, and carbon blacks such as described in Faith et al. "Industrial Chemicals," page 174–182, John Wiley & Sons, N.Y. (1950). These fillers should possess a surface area of at least 1 meter per gram, but preferably at least 75 meters per gram.

In addition to adding strength to these compositions, fillers act as blending aids for the organopolysiloxanes and polyethylene compositions of this invention since these two polymers are not very compatible without fillers. Thus, the addition of fillers to these two polymers results in a homogeneous product which is difficult to otherwise obtain.

In order that those skilled in the art may better understand how the present invention is practiced, the following examples are given by way of illustration and not by way of limitation. All parts are by weight.

EXAMPLE 1

A methyl polysiloxane gum was prepared by heating octamethylcyclotetrasiloxane with 0.01% KOH at 150° C. for about 6 hours. This gum had a room temperature viscosity of about $1 \times 10^6$ centipoises. This product will hereafter be referred to as a "silicone gum."

In order to test the extrudibility of filled polyethylene containing minor amounts of an organopolysiloxane a series of compositions were prepared by intimately mixing 1.5 parts of di-α-cumyl peroxide, and 25 parts of Aerosil fumed silica (particle size 15–20 mμ), 0–5 parts of silicone gum (Example 1) and sufficient polyethylene (Alathon #10) to make up 100 parts in all. These compositions were intimately mixed on a rubber mill at 120° C. and extruded in a heated extruder (120–150° C.) at the maximum rate of the machine. The comparative rate of extrusion and the surface of the extruded materials were observed. The results are presented in Table I.

Table I

| Example | Parts by Weight of Polyethylene | Parts by Weight of Silicone Gum | Extruded Product | Comparative Rate of Extrusion |
|---|---|---|---|---|
| 2 | 73.5 | None | Rough Surface | 1. |
| 3 | 73 | 0.5 | do | |
| 4 | 72.5 | 1.0 | Smooth Surface | 4 times, Ex. 2. |
| 5 | 68.5 | 5.0 | do | 4–5 times, Ex. 2. |

Table I shows that the presence of minor amounts of an organopolysiloxane enhances both the rate of extrusion and the appearance of the extruded product. Similar improvements in extrudibility and appearance are noted with other silicas, carbon blacks, calcium silicate and alumina.

In order to test the aging characteristics of polyethylenes containing organopolysiloxanes, the following compositions were prepared and tested. All of these compositions contained 100 parts of polyethylene (Bakelite 3422), 18 parts of precipitated silica having a particle size of 25 mμ (Hi-Sil 233), and 2.85 parts of di-α-cumyl peroxide. As a variable, no silicone gum was incorporated into Example 6, 2 parts of silicone gum (Example 1) were incorporated in Example 7, and 10 parts of silicone gum in Example 8. These compositions were blended on a rubber mill and cured for 30 minutes at 150° C. After testing the original physical properties, the compositions were heated for 6 days in an oven at 121° C. The results are presented in Table II.

*Table II*

| Example | Parts of Silicone Gum | Original Properties | | Properties after 6 Days at 121° C. | |
|---|---|---|---|---|---|
| | | Tensile Strength (p.s.i.) | Percent Elongation | Tensile Strength (p.s.i.) | Percent Elongation |
| 6 | None | 2,777 | 477 | 1,290 | 73 |
| 7 | 2 | 2,343 | 470 | 2,373 | 393 |
| 8 | 10 | 2,500 | 493 | 2,600 | 483 |

From Table II it is evident that minor amounts of an organopolysiloxane improved the aging characteristics of polyethylene for while the composition without any organopolysiloxane (Example 6) retained only 46.5% of its tensile strength and 15.3% of its percent elongation, polyethylene containing 2 parts of an organopolysiloxane (Example 7) retained 101% of its tensile strength and 84% of its percent elongation, and polyethylene containing 10 parts of an organopolysiloxane (Example 8) retained 104% of its tensile strength and 98% of the percent elongation.

From the foregoing, it is evident that filled polyethylene containing minor amounts of organopolysiloxanes can be more easily extruded than comparable compositions containing no organopolysiloxanes. In addition, these compositions, whether extruded or not, have improved aging characteristics. Thus, organopolysiloxanes can be incorporated into the filled polyethylene compositions of the prior art where the advantage of fast extrudibility or heat aging is desired. These compositions can be extruded over wire as an insulation material, and are adaptable for heat stable films and tapes in electrical insulations. These compositions containing conducting carbon blacks are useful as strong but flexible heat stable heating pads and tapes. Other uses will appear to those skilled in the art by modifying the filled polyethylene composition heretofore known with organopolysiloxanes so as to achieve the improved properties of this invention.

What I claim as new and desire to secure by Letters Patent of the United States is:

1. A solid composition of improved extrudibility and heat-aging characteristics comprising (1) solid polyethylene, (2) a filler selected from the group consisting of silica, carbon black, alumina, and calcium silicate, and (3) from 1 to 10% by weight, based on the weight of the polyethylene, of an organopolysiloxane curable to the solid elastic state and having from 1.98 to 2.01 silicon-bonded organic groups per silicon atom, said organic groups being selected from the group consisting of monovalent hydrocarbon radicals and monovalent, halogenated-aryl hydrocarbon radicals.

2. A solid composition of improved extrudibility and heat-aging characteristics comprising (1) solid polyethylene, (2) from 1 to 10%, by weight, based on the weight of the polyethylene, of an organopolysiloxane curable to the solid elastic state and having from 1.98 to 2.01 silicon-bonded organic groups per silicon atom, said organic groups being selected from the group consisting of monovalent hydrocarbon radicals and monovalent, halogenated-aryl hydrocarbon radicals, (3) a filler selected from the group consisting of silica, carbon black, alumina, and calcium silicate, and (4) from 0.1 to 20%, by weight, based on the weight of the polyethylene, of di-α-cumyl peroxide.

3. The cured product of claim 2.

4. A solid composition of improved extrudibility and heat-aging characteristics comprising (1) solid polyethylene, (2) from 1 to 10%, by weight, based on the weight of the polyethylene, of a dimethylpolysiloxane curable to the solid elastic state and having from 1.98 to 2.01 silicon-bonded methyl groups per silicon atom, (3) silica and (4) from 0.1 to 20%, by weight, based on the weight of the polyethylene, of di-α-cumyl peroxide.

5. The cured product of claim 4.

References Cited in the file of this patent

UNITED STATES PATENTS

| 2,448,530 | Jones | Sept. 7, 1948 |
| 2,628,214 | Pinkney et al. | Feb. 10, 1953 |
| 2,655,489 | Lawson | Oct. 13, 1953 |

OTHER REFERENCES

Kharash et al.: J. Org. Chem., 15, 756–762 (1950).